United States Patent [19]

Vallee et al.

[11] Patent Number: 6,014,646

[45] Date of Patent: Jan. 11, 2000

[54] PROCESS FOR MAKING A PAYMENT USING AN ACCOUNT MANAGER

[75] Inventors: Luc Vallee, Bretteville-le-Rabet; Stéphane Petit, Courseulles, both of France

[73] Assignee: France Telecom, Paris, France

[21] Appl. No.: 08/658,348

[22] Filed: Jun. 5, 1996

[30] Foreign Application Priority Data

Jun. 8, 1995 [FR] France .................................. 95 06769

[51] Int. Cl.⁷ .................................................. G06F 17/60
[52] U.S. Cl. ................................................ 705/39; 380/24
[58] Field of Search ................................ 705/39, 40, 42; 380/24, 25; 235/379, 380; 902/25, 26

[56] References Cited

U.S. PATENT DOCUMENTS

| 5,455,407 | 10/1995 | Rosen ...................................... 235/380 |
| 5,745,886 | 4/1998 | Rosen ......................................... 705/39 |
| 5,832,089 | 11/1998 | Kravitz et al. ............................ 380/24 |

FOREIGN PATENT DOCUMENTS

| 0391261 | 10/1990 | European Pat. Off. . |
| 0542298 | 5/1993 | European Pat. Off. . |
| 8503787 | 8/1985 | WIPO . |

OTHER PUBLICATIONS

Communications of the Association for Computing Machinery, vol. 28, No. 10, pp. 1030–1044, David Chaum, "Security without Identification: Transaction Systems to make Big Brother Obsolete", Nov. 1985.

Proceedings Esorics '94/Lecture Notes in Computer Science, vol. 875, Brighton, UK, pp. 207–215, Jan L. Camenisch et al., "An Efficient Electronic Payment System Protecting Privacy", Oct. 1994.

Scientific American, vol. 267, No. 2, pp. 76–81, David Chaum, "Achieving Electronic Privacy", Aug. 1992.

Tatsuaki Okamoto et al., Universal Electronic Cash, pp. 324–337, J. Feigenbaum, Santa Barbara, Aug. 1991.

Advances in Cryptology, Santa Barbara, S. Goldwasser, pp. 319–327, David Chaum et al., "Untraceable Electronic Cash", Aug. 1988.

Computer & Security International Journal Devoted to the Study of Technical and Financial Aspects of Computer Security, vol. 9, No. 8, pp. 715–721, Burk et al., "Value Exchange Systems Enabling Security and Unobservability", Dec. 1990.

Primary Examiner—Allen R. MacDonald
Assistant Examiner—Hani M. Kazimi
Attorney, Agent, or Firm—Pearne, Gordon, McCoy & Granger LLP

[57] ABSTRACT

The present invention relates to a process for making a payment using an account manager or kiosk, the process guaranteeing the payment of the supplier and the anonymity of the customer. A customer (U) withdraws from his bank (B) a sum in the form of "blind" electronic coins or cash, deposits the latter in one or more anonymous accounts in a kiosk (K) and finally uses said account or accounts for paying suppliers of goods or services (SA). The invention has application to streamline and voice telepayment.

19 Claims, 4 Drawing Sheets

OPENING AN ANONYMOUS ACCOUNT

CUSTOMER U — KIOSK K

RESERVATION OF RANDOM NUMBERS PRIOR TO A PURCHASE OF ELECTRONIC COINS

CUSTOMER U — KIOSK K

PURCHASE OF ELECTRONIC COINS

CUSTOMER U — BANK B

PHASE 1

PHASE 2 (SUBSEQUENT)

PROCESS FOR MAKING A PAYMENT USING AN ACCOUNT MANAGER

TECHNICAL FIELD

The present invention relates to a process for making a payment using an account manager, said process guaranteeing the payment of the supplier and the anonymity of the customer.

PRIOR ART

Credit or debit card systems offer a guarantee of payment but, as each payment is notified to the account manager associated with the card, the anonymity of the customer is not protected. "Purse" systems as defined in European Standard: Identification card systems intersector electronic purse; security architecture (European standards committee, CEN 1994, Ref. No. prEN 1546-2: 1994 F) make it possible to link payments, due to the use of a support identifier and fixed codes. Direct reloading with the aid of a bank account breaks the anonymity by linking the identity of the account holder and the purse support.

Telepayment systems by electronic funds transfer or with a smart banking card, as defined by AFFAD or Association Francaise pour le Paiement à Distance Final AFPAD document on telepayment ("Payment Procedures", appendex III, AFPAD/GT2/90/446/MS, Jul. 9, 1990) offer the supplier the guarantee of payment, but do not ensure customer anonymity.

A known process, as described in "An Efficient Electronic Payment System Protecting Privacy" by J. L. Camenisch, J. M. Piveteau and M. A. Stadler (Proceedings of ESORICS 94—"Lecture Notes in Computer Science" 875, Springer-Verlag, Berlin, November 1994), proposes a management of anonymous accounts by a manager of non-anonymous accounts. Such a manager can relatively easily break the anonymity of his customers. Moreover, the order in which the customer deposits the electronic cash in his anonymous account is necessarily the same as that in which he has withdrawn the same.

A prior art process known as "securized token", as described in French Patent Application 91400916.2 filed Apr. 1, 1997, offers the supplier a payment guarantee, but the account manager knows all the transactions (reloadings and payments) carried out by the customer carrying the token, as well as his identity.

To obviate the disadvantages of the prior art processes, the present invention aims at protecting the private life of the customer by preserving his anonymity, whilst still maintaining the payment guarantee for the supplier.

DESCRIPTION OF THE INVENTION

The present invention relates to a process for performing a transaction, wherein:

- a separation is made between a first entity (bank B) distributing an anonymous electronic means making it possible to credit an anonymous or non-anonymous account which a user (customer U) has at a second entity (kiosk K), and a second entity hosting, for each user, one or more anonymous or non-anonymous accounts credited by each user with the anonymous electronic means and debited in order to pay other users,
- use is made of an anonymous electronic means utilizing random numbers, withdrawn from a first entity for crediting an anonymous or non-anonymous account hosted by a second entity,
- use is made of random number tables associated with each anonymous or non-anonymous account for permitting an order of credit operations of each account independent of the order of withdrawal operations with respect to said numbers from the second entity by the user owning the account and independent of the order of uses of these numbers for the withdrawal of anonymous electronic means from a first entity, and which comprises the following stages:
  - a second entity generating random numbers for each anonymous or non-anonymous account permitting an order of withdrawal operations of these numbers from the second entity by the user owning the account independent of the order of uses of these numbers for the withdrawal of the anonymous electronic means from a first distributing entity,
  - with the aid of a random payment means, the user acquires from the distributing entity the anonymous electronic means for a certain amount, using one of the random numbers attached to the anonymous or non-anonymous account hosted by the second unit which he wishes to credit,
  - the user credits an anonymous or non-anonymous account at the entity hosting one or more anonymous or non-anonymous accounts for this amount, with the aid of said anonymous electronic means acquired from the distributing entity and the random number used is deleted from the table attached to the credited account,
  - the user debits one or more anonymous or non-anonymous accounts in order to credit an anonymous or non-anonymous account of a second user (supplier).

According to the invention, a supplier obtains the guarantee of being paid and the customer remains anonymous in the sense that his identity is not linked with his payments and the possibility of linking together the payments can be decreased as desired.

Advantageously, for reloading a given anonymous account, the user (customer) obtains from a second entity (kiosk) at least one random number and then purchases from a first entity (bank) a signature in the form of an electronic cash or coin for a given amount for each random number. He then deposits the corresponding cash or coins in a given account in a random order at a random time. The second entity then presents the cash or coins for crediting by the first entity.

Advantageously during a purchase, the second user (supplier) sends a request indicating the amount to the first user (customer), who signs it and returns it to the second user. The latter transmits it for payment to the second entity (kiosk) which, in the case of an adequate credit in the anonymous account used by the first user, acknowledges the request in positive form and carries out the corresponding credit-debit operation.

The first user (customer) has the possibility to transfer all or part of this cash between individual anonymous accounts, as well as to reimburse all or part of the sums on these anonymous accounts at the first entity (bank).

Thus, the invention proposes a process, which breaks the possibility of links between a payment and a withdrawal and, as desired by the customer, between two payments.

The separation made between withdrawals and payments results from the use of anonymous accounts on the second entity (kiosk) and the separation of the two modification phases of these anonymous accounts.

According to different variants of the invention, it is possible to have the following features:

the first user (customer) opens an anonymous account at a second entity (kiosk);

the first user (customer) purchases from a first entity (bank) where he has a known or non-known account (cash payment) anonymous electronic cash, which he deposits in an anonymous account hosted by a second entity in an order not linked with that of the purchase;

the first user deposits anonymous electronic cash in an anonymous account hosted by a second entity in an order not linked with that of the purchase;

the first user spends cash deposited in an anonymous account, hosted by a second entity, in the form of a securized transfer to an anonymous or non-anonymous account hosted by a second entity;

the securized transfer takes place after a special request;

securized transfers are performed after a periodic transfer request on a given periodicity unit;

securized transfers are grouped to be presented together to the second entity, after previously obtaining an authorization with respect to a given amount, obtained from said same entity;

the first user can authorized prior to use the deduction of a maximum amount from an anonymous account by a second user (supplier) and for a given operation, said deduction being carried out following the effective use of the service;

the first user is reimbursed wholly or partly with respect to the cash which he holds in an anonymous account at a second entity in order to deposit it in a known account held with a first entity;

as desired, the first user can render impossible any link between payments by using each anonymous account a single time and optionally facilities offered by the system constituted by a transfer between individual anonymous accounts and reimbursement.

Thus, the invention permits the guarantee of the payment of the second user (supplier) and the protection of the anonymity of the first user (customer). It can be used in systems requiring a term or on-deed payment and in voice telepayment.

In a first advantageous variant, during the payment of a second user (supplier) the amount indicated to the first user (customer) can be a unitary amount. The first user on his own initiative sends signatures to the second user with the necessary regularity (periodically in time or by page, e.g. on request). The second user transmits these signatures streamline to the second entity (kiosk), which acknowledges them in the same way.

In a second advantageous variant, there is a grouping of payments with authorization. This operation can be performed unknown to the first user (customer). In the preceding hypothesis, so as not to be penalized for small unitary amounts, the second user (supplier) can accompany the first signature of the first user (customer) by an authorization request with the second entity (kiosk) for a certain number of units and only transmits to the second entity the group of signatures in a pack, whereof the sum is equal to or smaller than the requested authorization. This procedure can be iterated during a first user (customer)—second user (supplier) relation (first request inadequate).

In a third advantageous variant, so as to ensure an anonymous account debit, whereof the account amount is known following the connection to the second entity (kiosk), prior to the use of the service it is possible to make a prepayment on an amount above the actually established amount. After the effective use, the second user (supplier) provides the second entity (kiosk) with information on the amount used. The second entity, with a maximum prepayment amount, debits the anonymous account of the first user (customer).

In a fourth advantageous variant, the link between payments is rendered impossible by the use on a single occasion of each anonymous account of the first user (customer). The transfers between anonymous accounts and the anonymous reimbursement facilitates this single use of anonymous accounts.

In an application to voice telepayment, the first user (customer) only has one device able to store a few intermediate values (blind signatures, identities, etc.), a secret signature production code and two strictly rising counters. A simple apparatus such as a Cartulette (registered trademark) with acoustic coupling with voice frequencies makes this system suitable for voice telepayment.

The process of the invention can also be used with advantage in a streamline payment application.

DETAILED DESCRIPTION OF EMBODIMENTS

The invention proposes a process for making a payment using an account manager, which breaks the possibilities of links between a payment and a withdrawal and, according to the wishes of the customer, between two payments.

The system uses four entity types:

a first user U, customer of a bank B and a supplier S, a first bank entity B distributing "blind" electronic cash and possible manager of a conventional account of the customer U, a second kiosk entity K managing anonymous accounts of customers U and accounts for suppliers S, a second user, supplying goods or services S.

The separation between withdrawals and payments results from the use of anonymous accounts on the kiosk and the separation of the two modification phases of these anonymous accounts.

For reloading an anonymous account, the customer obtains from the kiosk at least one random number for a given anonymous account and then purchases a blind signature (in the form of an electronic coin) for a given amount for each random number from the bank. He then deposits the corresponding coins in a given anonymous account in an random order and at a random time. The kiosk then presents the coins for crediting by the bank.

During a purchase, the supplier sends a request indicating the amount to the customer, who signs it and returns it to the supplier, who transmits it for payment to the kiosk which, in the case of an adequate credit in the anonymous account used by the customer, positively acknowledges the request and carries out the corresponding credit-debit operation.

The invention also makes it possible to carry out a transfer between anonymous accounts, as well as the total or partial reimbursement of the balance of the anonymous account of a customer.

Figure 1:
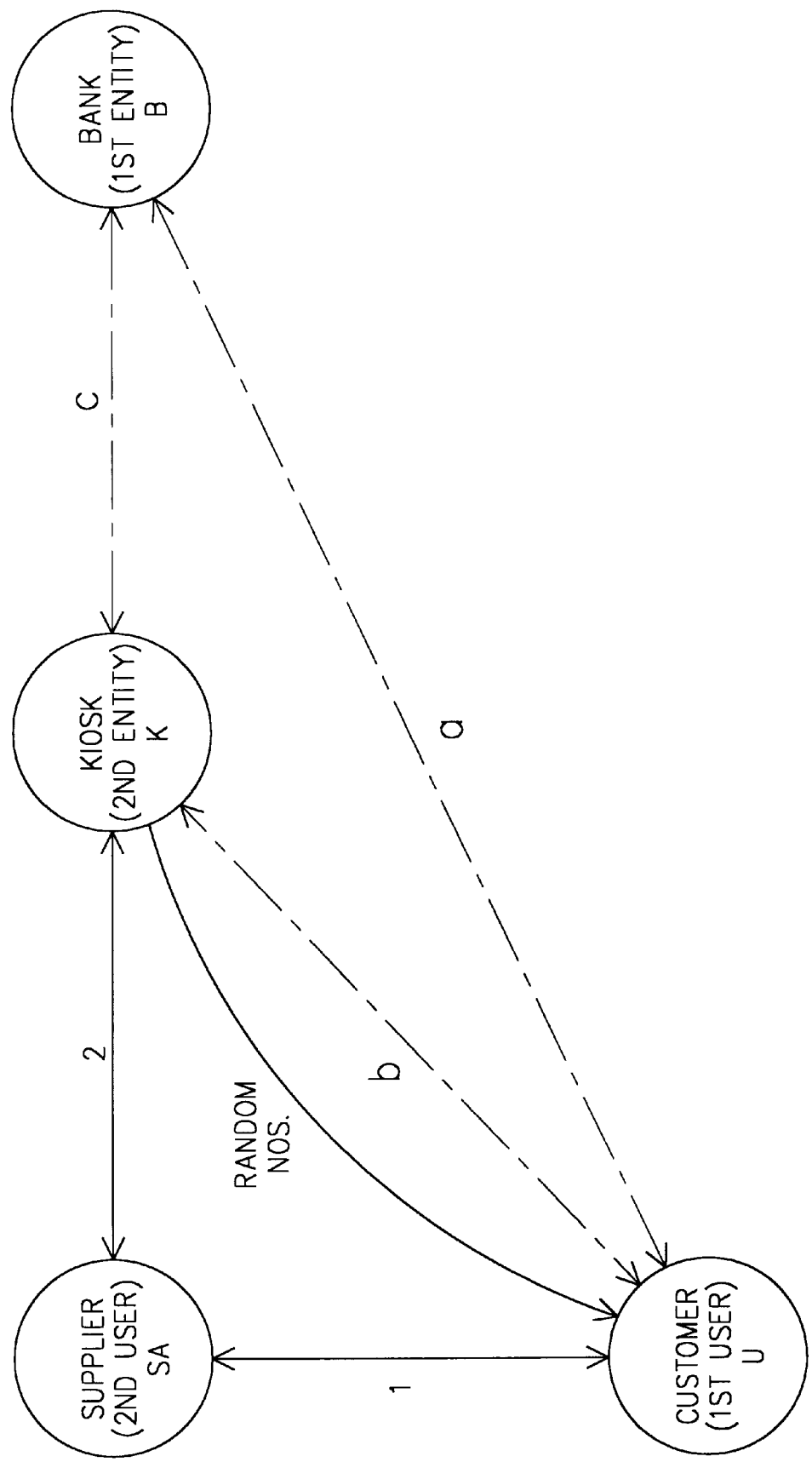
FIG. 1 of the drawing shows an architecture and global kinematics illustrating the process of the invention.

Thus, in FIG. 1 of the drawing can be seen U user (paying customer), SA applicative server (paid loaner), K kiosk (content of anonymous accounts) and B any anonymous cash distributor (bank, credit organization).

The recharging or reloading phase is represented in thin mixed lines in the drawing and is broken down as follows.

a. The user U purchases a cheque or electronic cash "blind" from the distributor B of an amount M' (in cash, on subscriber account or by bank card).

b. The user U credits an anonymous account (associated with a secret code) on the kiosk K with this cheque for an amount M', c. The kiosk K sends the cheque for an amount M' to the distributor B for compensation.

The use phase is represented by continuous lines and comprises two dialogues:

1. The server SA asks the user U to collect an amount M, the user U sending to the server SA a transaction for an amount M signed with the secret code of his anonymous account.

2. The serve SA sends this transaction to the kiosk K, which checks the signature, acknowledges the transaction and compensates the accounts (between the anonymous account of the user U and the known account of the server SA).

The functional distribution on these different entities is as follows:

Bank
- blind sale of electronic coins against payment in cash or debiting a conventional account,
- payment of electronic coins against the credit of a conventional account.

Kiosk
- management (opening, closing, consultation) of anonymous accounts,
- crediting an anonymous account against the deposit of an electronic coin,
- debiting an anonymous account and crediting another anonymous or non-anonymous account against the reception of a debit order from the owner of the debited anonymous account,
- participation in withdrawals of electronic coins and anonymous account reimbursements,
- compensation with banks and suppliers.

Customer
- recording under a pseudonym (anonymous account number) at the kiosk,
- purchase of electronic coins or cash from the bank,
- depositing the electronic coins in an anonymous account of the kiosk,
- signature of the payment order of the supplier,
- reimbursement of an anonymous account.

Supplier (or Applicative Server)
- recording at the kiosk,
- transmission of payment orders from customer to kiosk,
- possible transmission of acknowledgement of the kiosk to the customer.

The different protocols are described below. An anonymous account is designated by an identifier IC and with it are associated:
- a set of codes ($K_{SC}$, $K_{VC}$), the first being used for producing the signatures by the holder of the anonymous account and the second for checking these signatures,
- a counter for expenses DC on this account initialized to zero,
- a counter of reimbursements RC also initialized to zero,
- a table TC of random numbers supplied for withdrawals of electronic coins and not yet used.

Opening an Anonymous Account

Figure 2:
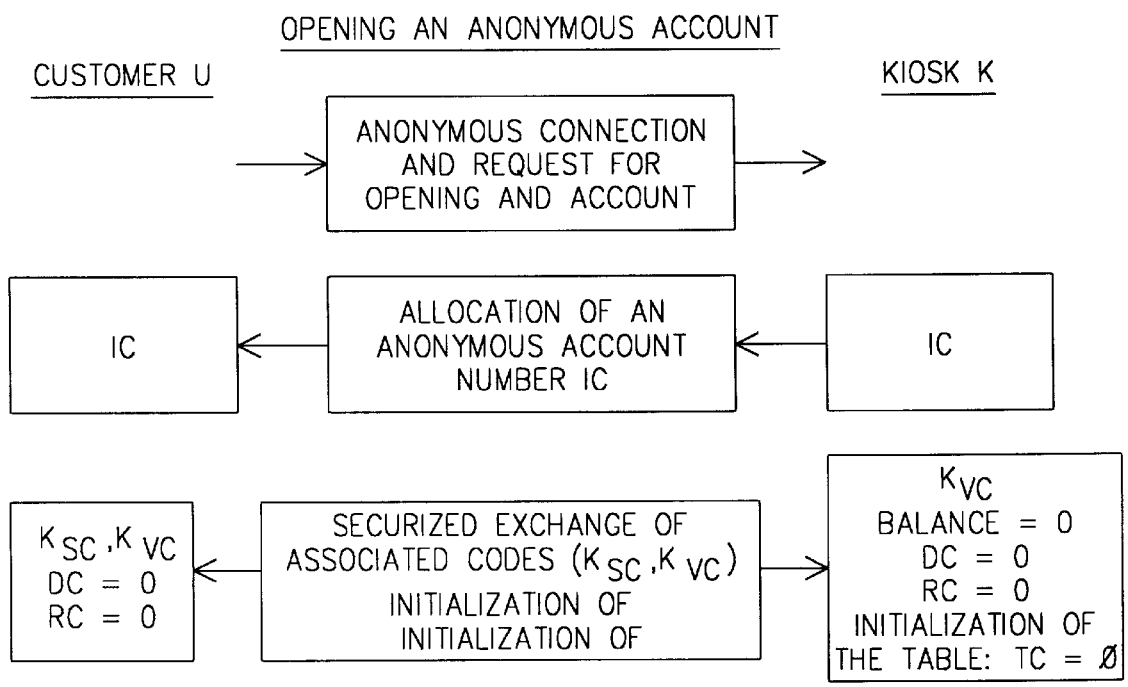
FIGS. 2–8 show exchange diagrams according to the invention.

As shown in FIG. 2, the customer is anonymously connected to the kiosk and requests the opening of an anonymous account. The operations consist of:
- the determination of an identifier number IC shared by the two entities, i.e. customer and kiosk,
- the production and exchange in securized form of codes, the signature code $K_{SC}$ being known to the customer, the verification code $K_{VC}$ being known to the two entities or only the kiosk,
- the zero initialization of the expense counter DC and the reimbursement counter RC, the counters being stored by the two entities,
- the creation of the empty random number table TC.

Reservation of Random Numbers Prior to an Electronic Cash Purchase

Figure 3:
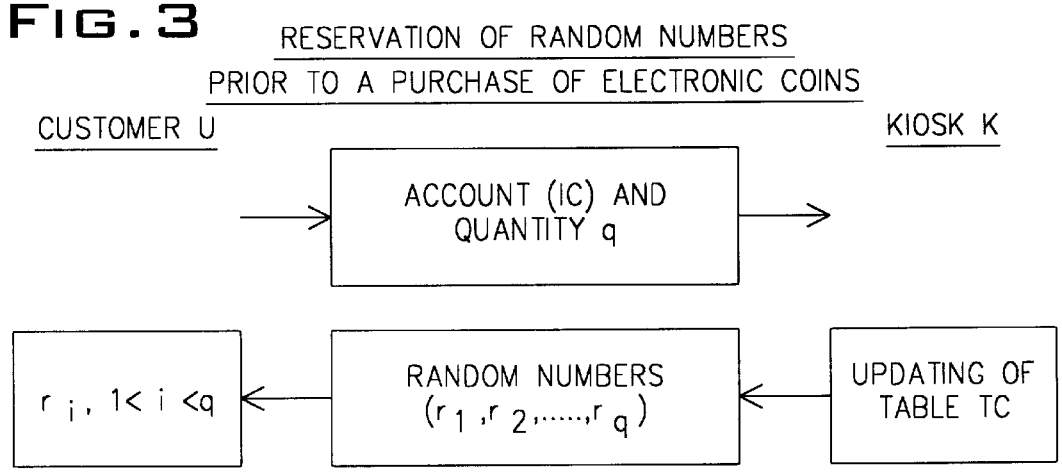

As shown in FIG. 3, the customer is connected anonymously, indicates the account number IC and requests from the kiosk a certain quantity q of random numbers.

The kiosk generates these random numbers $r_1, \ldots r_q$ in the random number table TC attached to account number IC and returns them to the customer in a form guaranteeing the integrity and authenticity of these random numbers, e.g. by a signature thereof (K, IC, $r_1, \ldots, r_q$).

Purchase of Electronic Coins or Cash

Figure 4:
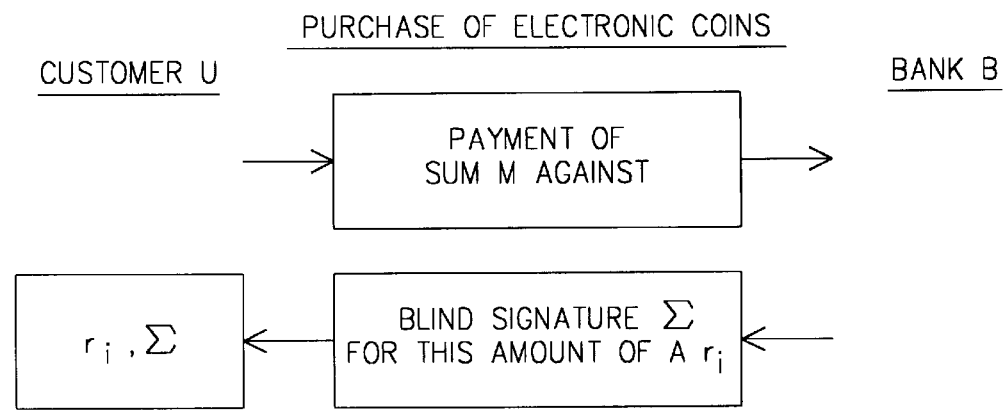

As shown in FIG. 4, each random number $r_i$ is usable for the withdrawal of an electronic coin, in a random use order compared with the order in which these random numbers are generated.

The withdrawal of electronic coins is a transaction between the customer and his bank. The customer is identified and authenticated in accordance with the conventional procedures between these two entities, so that the adequate account (bank, invoicing, etc.) CB is debited. This operation is not necessary if the customer pays by an anonymous means (cash).

The withdrawal of an electronic coin amounts to the obtaining of a blind signature. The bank signs blind a message from the customer containing at least the identity of the kiosk, the anonymous account and one of the random numbers withdrawn from the kiosk, i.e. K, IC, $r_i$. The obtaining of this blind signature corresponds to the debiting of the account CB or to the payment in cash for an amount M in one-to-one correspondence with the used signature function. This operation is repeated several times if the customer wishes to withdraw several electronic coins during the same session.

Depositing Electronic Coins at the Kiosk

Figure 5:
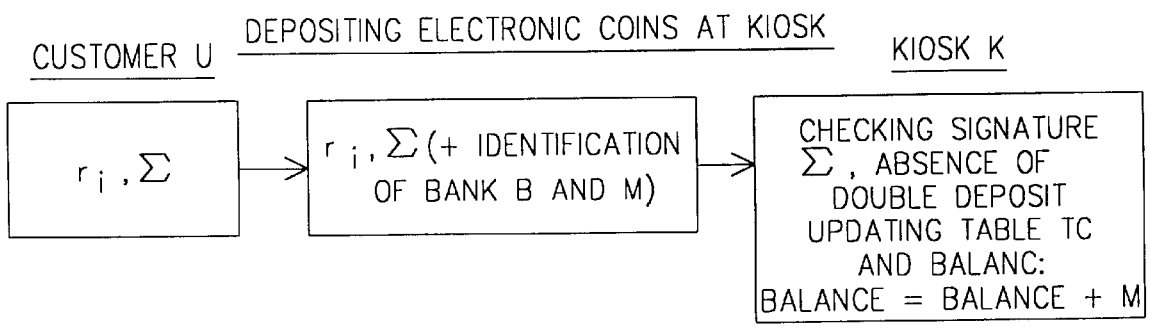

As shown in FIG. 5, the electronic coins must be deposited at the kiosk by the customer, who deposits same in a random order, without being in any way related to the withdrawal order of the random numbers $r_i$ or with that of the withdrawal of the electronic coins.

For this transaction the customer is connected in anonymous manner to the kiosk by referring only to his anonymous account IC. The customer transmits to the kiosk the electronic coins which he wishes to deposit giving at a minimum the account IC, the random number $r_i$ used and the blind signature obtained from the bank (indicating the bank and the way of finding the amount M and the associated checking function). For each coin, the kiosk checks that the random number presented is not used, the validity of the bank signature, withdraws from the random number table TC the entry corresponding to the random number used and credits the anonymous account of number IC with the amount M.

Kiosk Payment

Figure 6:
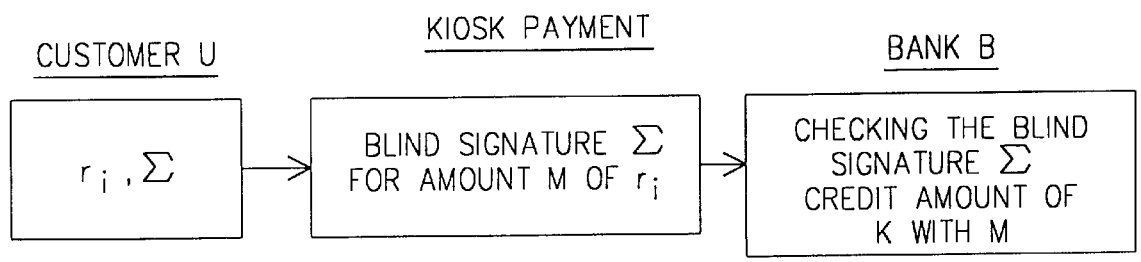

As shown in FIG. 6, to be paid by the bank, the kiosk presents the electronic coins (K, IC, $r_i$, blind signature). The bank checks the signatures, credits the account of the kiosk and returns the new balance. If it wishes, the bank checks the absence of double deposits of electronic coins by the kiosk.

Payment of a Supplier

Figure 7:
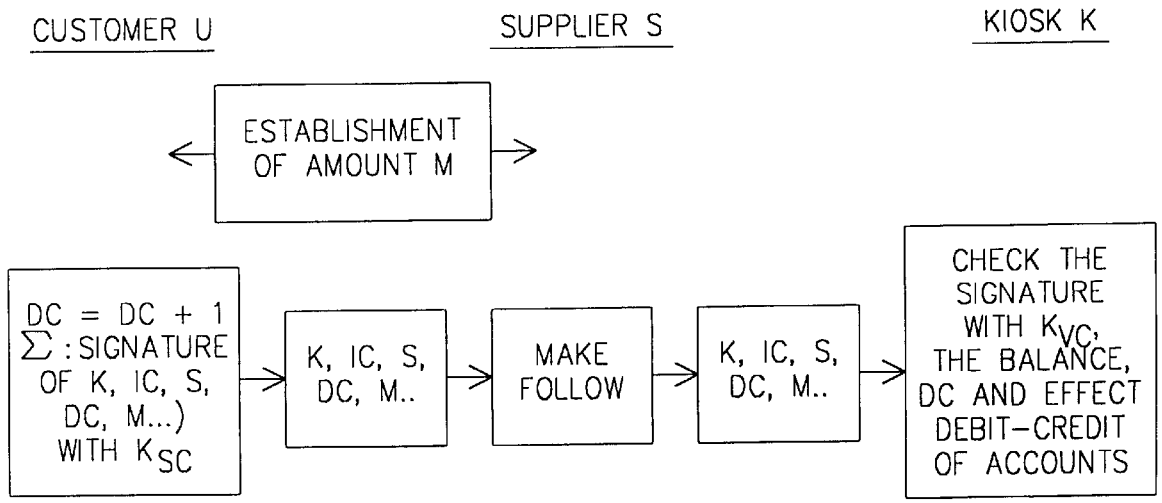
Figure 7:
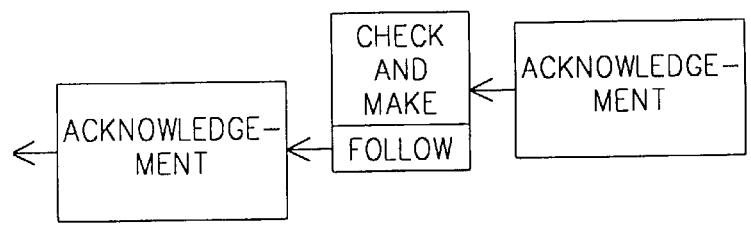

As shown in FIG. 7, in order to carry out the payment of a supplier, the customer produces signature using the expense counter DC. The supplier notifies the amount M to be paid to the customer. The customer increments his local expense counter DC and then produces a signature of the message including K, IC, S, DC and M, with the code $K_{SC}$ associated with his account IC. The supplier follows this signature and the informations used for its production to the kiosk. The kiosk checks the validity of the signature with the code $K_{VC}$, that the account IC has an adequate balance, that the value of the expense counter DC received is higher than the value which it knows. When all these conditions are fulfilled, the kiosk replaces the known value of the expense counter by the value received from the expense counter, debits the account IC of the amount M and credits the account of the supplier with the same sum. In all cases the kiosk sends a signed acknowledgement to the supplier, who optionally retransmits it to the customer (particularly in the case of a negative acknowledgement).

Transfer Between Individual Anonymous Accounts

This transfer is identical to the payment of a supplier. The supplier identity is replaced by the destination anonymous account number IC' and the amount M has not been transmitted from an entity to the customer. The exchange is direct between customer and kiosk.

Reimbursement

Figure 8:
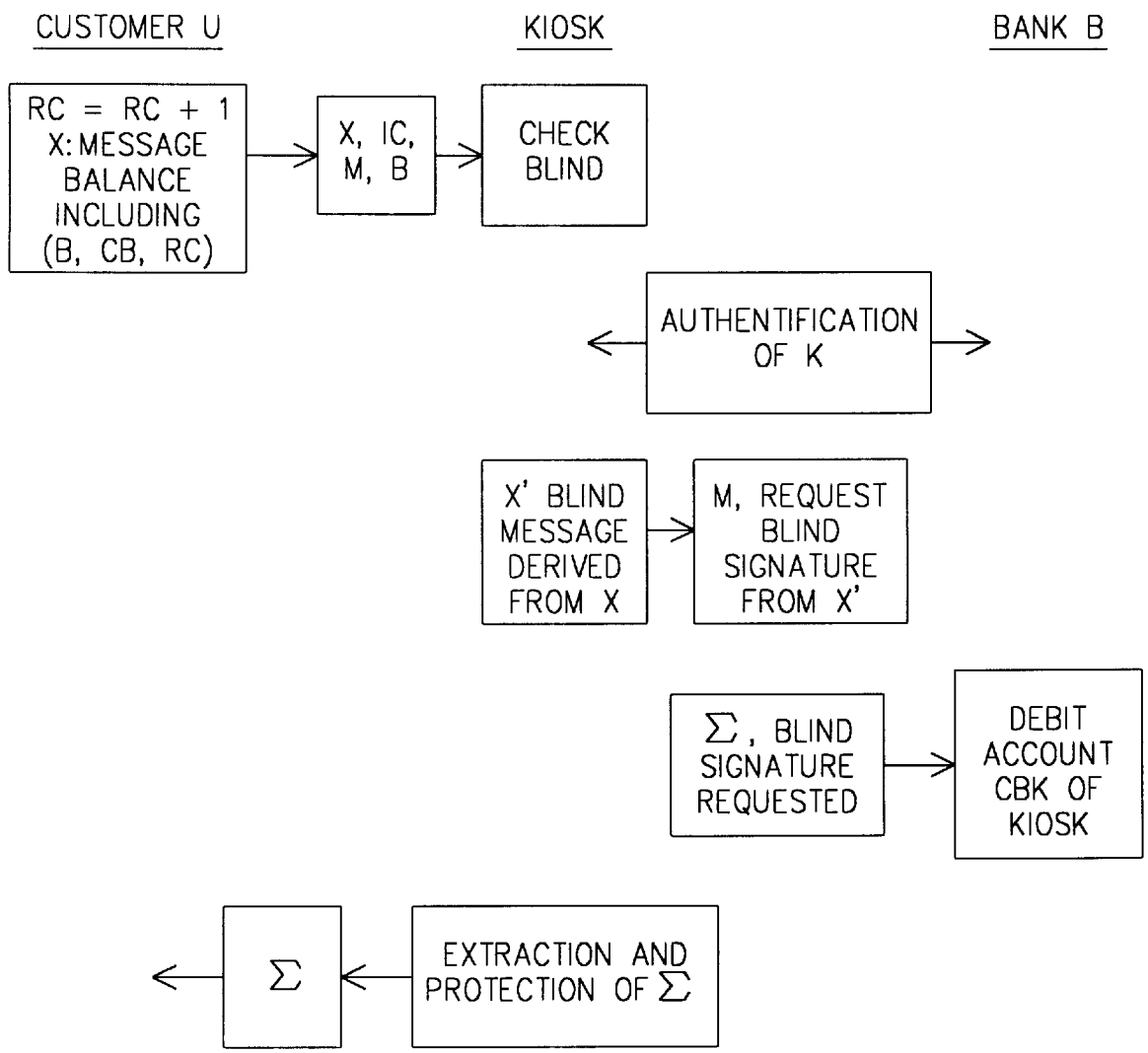
Figure 8:
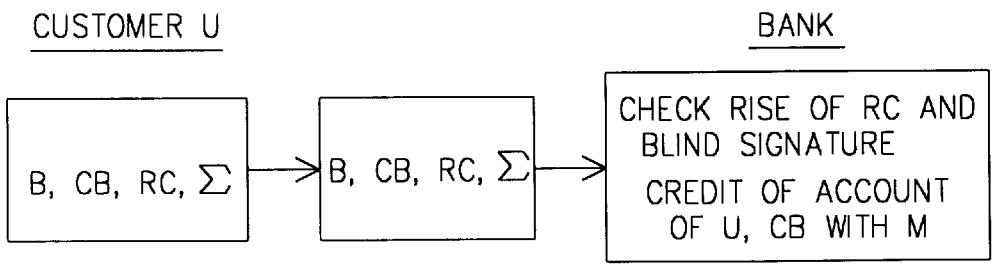

As shown in FIG. 8, the reimbursement uses a double blind signature mechanism. The initiative returns to the customer, who increments his reimbursement counter RC. The customer aims at obtaining a blind signature of the message including his account number CB from the bank, the reimbursement counter RC, with a signature of the bank corresponding to an amount M. For this purpose, he sends this "blinded" message to the kiosk accompanied by the number of the anonymous account IC, the amount M, the identification of the bank and signs everything. The kiosk checks that the balance of the anonymous account IC is adequate and checks the signature. It then authenticates with the bank for debiting the ordinary account CBK. It obtains from the bank a blind signature of the "blinded" message and the account CBK is debited the amount M. It returns this blind signature in securized manner to the customer, who extracts from it the signature which he wishes to obtain.

Subsequently the customer is reimbursed the amount by the bank transmitting to him the message including the number of his account to be credited CB, the value RC of the reimbursement counter used via the kiosk and the signature obtained for this message. The bank checks the signature, the consistency of the reimbursement counter RC and updates it and finally credits the account CB with the amount M. The deposit at the bank takes place with rising values of RC.

In a first variant, during the payment of the supplier the amount M indicated to the customer is a unitary amount. By his own initiative the customer sends the signatures to the supplier with the necessary regularity (periodically in time or by page, e.g. on request). The supplier transmits these signatures in streamline form to the kiosk, which acknowledges them in the same way.

In a second variant, there is a grouping of payments with authorization. This operation can be carried out unknown to the customer. In the preceding hypothesis, so as not to be penalized for small unitary amounts, the supplier can accompany the first signature of the customer by an authorization request from the kiosk for a certain number of units and only transmits to the kiosk the group of signatures in a pack, whose sum is equal to or below that corresponding to the requested authorization. This procedure can be iterated in a customer-supplier relation when the first request is inadequate.

In order to ensure a debit from an anonymous account, whose amount is known after connection to the kiosk, in a third variant it is possible prior to the use of the service, to carry out a prepayment for an amount exceeding the effectively established amount. Following the effective use, the supplier provides the kiosk with the information on the used amount. With a maximum prepayment amount, the kiosk debits the anonymous account of the customer.

In a fourth variant the link between payments is rendered impossible by the use of each anonymous account of the customer a single time. The transfers between anonymous accounts and anonymous reimbursements facilitate this single use of the anonymous accounts.

In an application to voice telepayment, the customer only has to have a device able to store a few intermediate values (blind signatures, identities, etc.), a secret, signature production code $K_{SC}$ and two strictly rising counters DC and RC. A simple apparatus such as a Cartulette (registered trademark), with acoustic coupling at voice frequencies (DTMF) makes this system suitable for voice telepayment.

We claim:

1. Process for performing a transaction in a system having four entity types, the entity types including:
    a first user;
    a second user supplying goods and services;
    a first entity;
    a second entity managing accounts of the first user and second user, which can be credited by the first user to pay the second user,
    wherein the first entity is a bank that manages a conventional account of the first user, the first user is a customer of the first entity and the second user, and the first user has accounts at the second entity, said process comprising the steps of:
        the second entity generating random numbers in random number tables for each account permitting distribution of the numbers from the second entity to the first user;
        the first user acquiring from the first entity an anonymous electronic means for a certain amount using one of the random numbers associated with one of the accounts hosted by the second entity that is to be credited;
        the first user crediting the one account at the second entity for the certain amount using the electronic means acquired from the first entity, the random number used being deleted from the table associated with the credited account; and
        the first user debiting one or more of the accounts in order to credit an account of the second user,
    wherein the random number tables permit the credits to each account in an order independent of an order of obtaining said numbers from the second entity by the first user owning the account and independent of the order of use of these numbers for the acquisition of anonymous electronic means from the first entity.

2. Process according to claim 1, wherein for reloading one of the accounts, the user obtains from the second entity at least one random number, acquires from the first entity a signature in the form of an electronic coin for a certain amount for each random number, and deposits the corresponding coins at the account, in a random order and at a random time and the second entity then presents the coins for crediting by the first entity.

3. Process according to claim 1, wherein during a purchase, the second user sends a request indicating the amount to the first user, who signs and returns the request to the second user, the latter transmits the request for payment to the second entity which, in the case of an adequate credit in the account used by the first user, positively acknowledges the request and the debiting of one or more of the accounts in order to credit the account of the second user is carried out.

4. Process according to claim 1, wherein the first user transfers all or part of the balance of one account to another account.

5. Process according to claim 1, wherein the first user reimburses all or part of the sums in one or more accounts to the first entity.

6. Process according to claim 1, wherein the first user acquires, from a first entity where the first user has an account, anonymous electronic cash, which the first user deposits in an anonymous account hosted by a second entity in an order not determined by an order of purchase.

7. Process according to claim 1, wherein the first user spends the cash in an anonymous account hosted by the second entity, in the form of a securized transfer to an anonymous or non-anonymous account hosted by the second entity.

8. Process according to claim 7, wherein the securized transfer is carried out after a special request.

9. Process according to claim 7, wherein securized transfers are carried out following a periodic transfer request on a given periodicity unit.

10. Process according to claim 7, wherein securized transfers are grouped to be presented together to the second entity, following obtaining a prior authorization, with respect to a given amount, obtained from the second entity.

11. Process according to claim 1, wherein during payment of the second user, the amount is indicated to the first user as a unitary amount, wherein by its own initiative the first user sends signatures to the second user periodically and wherein the second user transmits these signatures in streamline form to the second entity, which acknowledges the signatures in streamline form.

12. Process according to claim 1, wherein a group of payments is made with authorization, said authorization being preformed unknown to the first user.

13. Process according to claim 1, wherein in a manner such as to ensure debiting of the account, whose amount is known following the connection to the second entity, prior to the use of the service, a prepayment is made on an amount exceeding the effectively established amount, wherein the second user, following the effective use, supplies the second entity with information on the used amount and wherein the second entity, with a maximum prepayment amount, debits the anonymous account of the first user.

14. Process according to claim 1, wherein the link between payments is rendered impossible by the use of each anonymous account of the first user a single time and wherein the transfers between anonymous accounts and the anonymous reimbursement facilitate this single use of the anonymous accounts.

15. Process according to claim 1, which is used in a voice telepayment application.

16. Process according to claim 1, which is used in a streamline payment application.

17. Process for performing a transaction among a first user, a second user, a first entity, and a second entity, the process comprising the steps of:

the second entity generating random numbers in tables associated with accounts of the first user hosted by the second entity and delivering the numbers to the first user;

the first user acquiring from the first entity an anonymous electronic means for a certain amount using one of the random numbers associated with one of the accounts;

the first user crediting the one account for the certain amount using the electronic means;

the second entity deleting the random number used from the table associated with the credited account; and the first user debiting at least one of the accounts in order to credit an account of the second user hosted by the second entity.

18. Process according to claim 17, wherein the first user is wholly or partly reimbursed for the cash the first user has in an anonymous account at the second entity in order to deposit the cash at a known account which the first user has at the first entity.

19. Process according to claim 17 wherein an order of credit operations of each account is performed independent of an order of withdrawal operations with respect to said numbers from the second entity by the first user owning the account and independent of the order of the uses of these numbers for the withdrawal of the anonymous electronic means from the first entity.

* * * * *